United States Patent
Aigner et al.

(10) Patent No.: US 10,376,800 B1
(45) Date of Patent: Aug. 13, 2019

(54) APPARATUS WITH SUPPORT MECHANISM DISPOSING ALTERNATE FACING GAMING DISPLAY AND VIRTUAL REALITY VIEWING

(71) Applicant: Hasbro, Inc., Pawtucket, RI (US)

(72) Inventors: Gary D Aigner, East Greenwich, MA (US); Alex Howell, Pawtucket, RI (US); Thomas Maguire, Warwick, RI (US)

(73) Assignee: HASBRO, INC., Pawtucket, RI (US)

( * ) Notice: Subject to any disclaimer, the term of this patent is extended or adjusted under 35 U.S.C. 154(b) by 0 days.

(21) Appl. No.: 15/977,847

(22) Filed: May 11, 2018

Related U.S. Application Data

(60) Provisional application No. 62/505,467, filed on May 12, 2017.

(51) Int. Cl.
A63H 3/00 (2006.01)
A63H 3/48 (2006.01)
G06F 1/16 (2006.01)
G06T 19/00 (2011.01)
A63H 30/02 (2006.01)

(52) U.S. Cl.
CPC .............. A63H 3/48 (2013.01); A63H 30/02 (2013.01); G06F 1/1637 (2013.01); G06T 19/006 (2013.01); A63H 2200/00 (2013.01)

(58) Field of Classification Search
CPC .... A63F 9/001; A63F 13/98; A63F 2300/204; G06F 1/1637; G06T 19/06; H04M 1/04; H04M 1/72527
See application file for complete search history.

(56) References Cited

U.S. PATENT DOCUMENTS

| 5,661,632 | A | 8/1997 | Register |
| 6,558,225 | B1 | 5/2003 | Rehkemper et al. |
| 7,500,758 | B1 | 3/2009 | Adachi et al. |
| 8,023,029 | B2 | 9/2011 | Joseph |
| D719,621 | S | * 12/2014 | Song .............................. D21/578 |
| 8,914,139 | B2 | * 12/2014 | Badavne ................... A63H 3/28 180/7.1 |
| 8,926,395 | B2 | 1/2015 | Zheng |
| 9,577,694 | B1 | * 2/2017 | Albee ................... H04B 1/3877 |
| 9,968,861 | B2 | * 5/2018 | Brown, Sr. ............. A63H 3/005 |
| 2010/0077341 | A1 | * 3/2010 | Chen ...................... G06F 1/1626 715/782 |

(Continued)

FOREIGN PATENT DOCUMENTS

GB 2469860 A 11/2010

OTHER PUBLICATIONS

"Flipside Charade" App, iTunes Apple App Store, updated Feb. 22, 2014.

Primary Examiner — Jay Trent Liddle
Assistant Examiner — Alex F. R. P. Rada, II
(74) Attorney, Agent, or Firm — Perry Hoffman

(57) ABSTRACT

Toy electronic display structures to receive and support a user to rotating their electronic display device resulting in first and second viewing configurations, with a support mechanism disposing alternate facing gaming display and virtual reality viewing of the electronic display device. A smart phone with a display screen or like electronic display device is arranged to direct the display screen of the smart phone in oppositely disposed for different viewing configurations.

20 Claims, 10 Drawing Sheets

(56) References Cited

U.S. PATENT DOCUMENTS

| | | | |
|---|---|---|---|
| 2012/0098837 A1* | 4/2012 | Hulbert | A63F 13/98 |
| | | | 345/473 |
| 2012/0287565 A1* | 11/2012 | Bennett, Jr. | A45C 11/00 |
| | | | 361/679.01 |
| 2013/0040530 A1* | 2/2013 | Matsuno | A63H 3/28 |
| | | | 446/73 |
| 2013/0043778 A1* | 2/2013 | Bennett, Jr. | A45C 11/00 |
| | | | 312/326 |
| 2013/0095725 A1 | 4/2013 | Von Mohr et al. | |
| 2014/0094242 A1* | 4/2014 | Annis | A63F 9/001 |
| | | | 463/16 |
| 2014/0273716 A1* | 9/2014 | Annis | A63H 33/22 |
| | | | 446/175 |
| 2015/0174499 A1* | 6/2015 | Rosenheck | A63H 3/005 |
| | | | 434/118 |
| 2015/0306516 A1 | 10/2015 | Stocker-Edwards | |
| 2017/0235339 A1* | 8/2017 | Scales | G06F 1/1626 |
| | | | 361/679.56 |
| 2017/0246546 A1* | 8/2017 | Brown, Sr. | A63H 3/005 |

\* cited by examiner

APPARATUS WITH SUPPORT MECHANISM DISPOSING ALTERNATE FACING GAMING DISPLAY AND VIRTUAL REALITY VIEWING

PRIORITY CROSS-REFERENCE TO RELATED APPLICATION

This application claims priority pursuant to 35 U.S.C. 119(e) or 120 from U.S. Provisional Application No. 62/505,467 filed May 12, 2017 for inventions disclosed therein incorporated by reference.

1. FIELD OF THE INVENTION

The present invention relates to toy apparatus for receiving an electronic display device, and more particularly, to a toy apparatus for receiving an electronic display device in a support mechanism that allows a user to rotate the electronic display device resulting in first and second viewing configurations.

2. BACKGROUND OF THE INVENTION

There are known apparatus/plush toys that provide for the incorporation of various electronic devices. Most of these known toys merely receive and dock the electronic device with the device's display visible and accessible to a user. Some known devices utilize a software application and the devices technologies to display images, for example, in the face of a stuffed animal, which gives the user an experience of interacting with the toy, and some devices additionally allowing the user to control the operation of the limbs of the toy with the received electronic device. It is also known to provide software applications downloaded to an electronic display device and operable with the technologies of the device, such as an accelerometer, etc., which enables a user to change screens during game play by tilting the electronic display device. None of the known devices however, employs a support mechanism within a toy housing which simply yet precisely disposes a received electronic device displayed upright in a first viewing configuration and in an oppositely directed second viewing configuration for alternate game play and virtual reality viewing.

A known apparatus/toy for receiving and docking a handheld device is exemplified and disclosed in GB Patent Application 2,469,860, published Mar. 11, 2010, to Luckybite LLP. A handheld device, such as an electronic device, i.e. a smart phone, is incorporated into a physical element, such as a stuffed animal, and positioned with the display screen of the electronic device facing cut-out areas in the physical element. The electronic device runs an application which controls video images displayed on the screen with the images appearing in the cutout areas with the application utilizing sensors of the electronic device, such as the accelerometer to align and select content to display on the screen. For example, a stuffed animal with cutout eye holes can become a docking station for a smart phone positioned with the display screen facing the cut-out eye holes. The application on the smart phone utilizes various technologies of the phone and interplays with the stuffed animal such that the animal face appears to have real animated eyes, registering touch input and displaying eye movement. Alternatively, a monocular eye piece can protrude from a cutout in docking station where the electronic device is positioned so as to allow the user to view images on the inserted electronic device that appear to be magnified, or alternatively appear 3D if appropriate optics are included within the eye piece. The electronic device is supported in only one position within the physical element and the display of the device is viewed through only one opening in the physical element. Luckybite does not teach or disclose a physical element having both a forward-facing and a rearward-facing openings and a support mechanism within for receiving an electronic device and disposing the display of the device to be viewed upright from the forward-facing opening in a first supported position and also viewed upright from the rearward-facing opening in a second supported position for dynamic game play switching to intermittent periods of alternate virtual reality viewing with a simple rotation of the support mechanism.

Other known display devices have a docking station within a doll or plush toy and combine with an electronic device such as a smart phone and employ smart phone technologies to control images displayed on the smart phone. For example, the toy as exemplified and described in US Patent Application No. 2013095725, published Apr. 18, 2013 to Von Mohr et al., includes a figurine toy combined with a smart phone-type device with display controlling software apps, received into a receptacle with the display of the smart phone representing animated facial features for the figurine toy. The smart phone physically covers the static facial features of the figurine toy when received into the receptacle of the figurine toy, replacing the static facial features with digital animated facial features on the smart phone display screen.

Additionally, there are other known display devices, as exemplified and described in US Patent Application No. 20140273716, published Sep. 18, 2014 to Annis et al., having a docking station within a plush toy and combining with an electronic device such as a smart phone, employing smart phone technologies, such as the accelerometer, to control images displayed on the smart phone. The display screen of the smart phone is viewed through a cutout in a doll or plush toy, and can prompt a user to respond to various instructions or questions by touching the display screen, tilting the doll or speaking into the smart phone with a response.

Another known display device which docks a smart phone at the face position of an operable toy such as a dog is exemplified and disclosed in US Patent Application No. 20130040530, published Feb. 14, 2013, to Matsuno. The toy dog includes a body with four movable limbs, a sound output unit, a control unit, and a transmission member that transmits a signal output by the smart phone, in accordance with user input, to the sound output unit where the control unit controls the operation of the four limbs.

A known apparatus/plush toy, exemplified and disclosed in US Patent Application No. 20150306516, published Oct. 29, 2015 to Stocker-Edwards, is transformable between a first and second configuration is seen to include a movable member that is attached to a stuffed toy. The stuffed toy includes head and body portions with a generally happy face permanently affixed to the head. The movable member is attached to the stuffed toy at one end of the head and includes a generally cranky face permanently affixed to a side of the movable member. In the first configuration the cranky face is viewed as the movable member covers the happy face of the head portion, and in the second configuration the movable member is removed to reveal the happy face it was covering.

Additionally, software applications capable of downloading to an electronic device and operable with the technologies of the device, such as accelerometers, are known. It is known to include a software application in an electronic device which enables a user to change screens during game play by tilting the electronic device, as exemplified and disclosed in "Flipside Charade" Application. In "Flipside Charade", the user supports the device on their person and tilts the device to change screens in a game based on the position of the device as detected by the devices accelerometer. The electronic device is not supported by a mechanism but instead is held in the user's hand and is not received within an apparatus/plush toy including a support mechanism nor disposed for viewing upright in a forward-facing opening and also a rearward-facing opening for dynamic game play with alternate virtual reality viewing.

It is also known to combine play on an electronic device with a plush toy. The electronic device includes software applications that can create digital images which mimic the look of the physical toy/plush toy. The software applications create a digital toy that looks like the physical toy to extend play of the physical toy into the digital world on the electronic device.

Significantly, known apparatus/plush toys do not include a support mechanism which simply yet precisely disposes a received electronic device displayed upright in a forward-facing opening in a first supported position and in a rearward-facing opening in a second supported position for alternate game play and virtual reality viewing. It would be desirable to provide an apparatus with a plush toy housing for supporting an electronic device for alternate facing configurations viewed through a first forward-facing opening in the plush toy and a second rearward-facing opening in the plush toy. The received electronic device includes an orientation sensor responsive to the orientation of the received device for changing the display of the received device. A support mechanism in the housing is responsive to a control on the toy and supports the electronic device between a first position with its display facing upright in the first opening, the first viewing configuration, and switching to a second position with its display facing upright in the second opening, the second viewing configuration.

SUMMARY OF THE INVENTION

The present invention addresses shortcomings of the prior art to provide an apparatus with a toy housing which simply yet precisely disposes a received electronic device displayed upright in a forward position and upright in a rearward position for alternate game play and virtual reality viewing. A support mechanism in the housing is responsive to a control mounted to toy and supports the device between the first position and second positions for alternate viewing.

Briefly summarize, the present inventions relate to apparatus and methods which support an electronic display device for alternate facing configurations. The toy housing has a first forward-facing opening and a second rearward-facing opening and an interior for receiving the electronic display device therein. The received device includes an orientation sensor responsive to the orientation of the received device for changing the display of the received device. A control provided on the housing, with a support structure in the housing is responsive to the control and support the received device between a first position with its display facing the first opening and a second position with its display facing the second opening of the housing where the orientation sensor of the received device changes its display for being upright for viewing respectively through the first opening in the first position and for viewing through the second opening in the second position.

BRIEF DESCRIPTION OF THE DRAWINGS

For the purpose of facilitating an understanding of the invention, the accompanying drawings and detailed description illustrate preferred embodiments thereof, from which the invention, its structures, its construction and operation, its processes, and many related advantages may be readily understood and appreciated.

DETAILED DESCRIPTION OF THE EMBODIMENTS

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope of the present invention.

Figure 1:
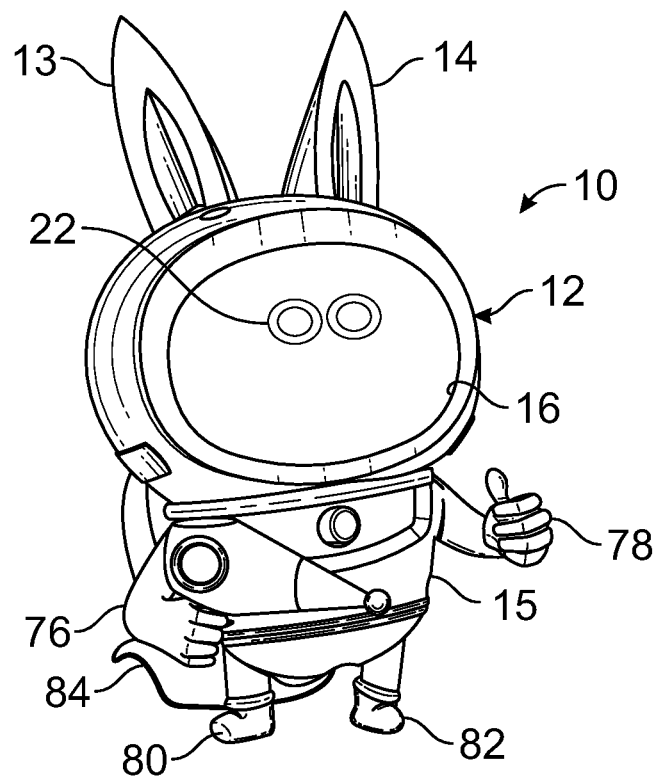
FIG. 1 is an isometric view of a toy apparatus of the present invention.
Figure 2:
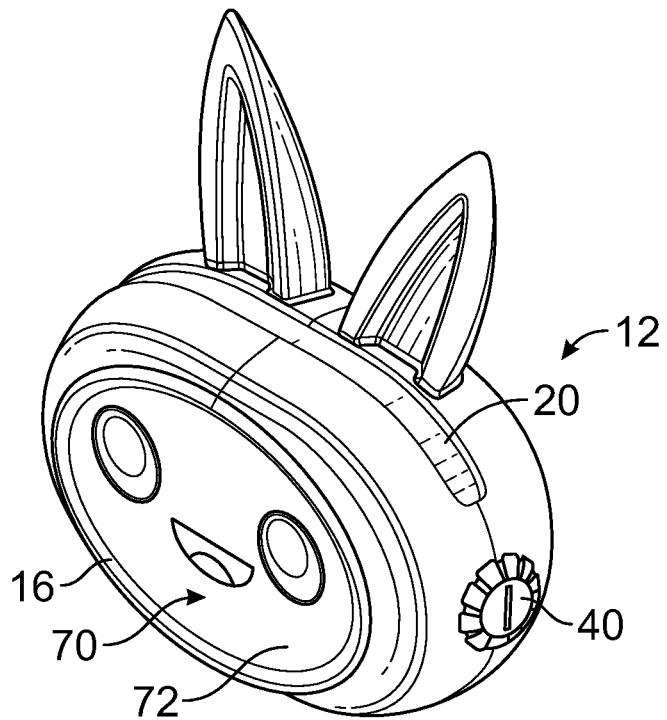
FIG. 2 is an isometric view of a head portion housing of the toy apparatus shown in FIG. 1 and illustrating a first viewing configuration.
Figure 3:
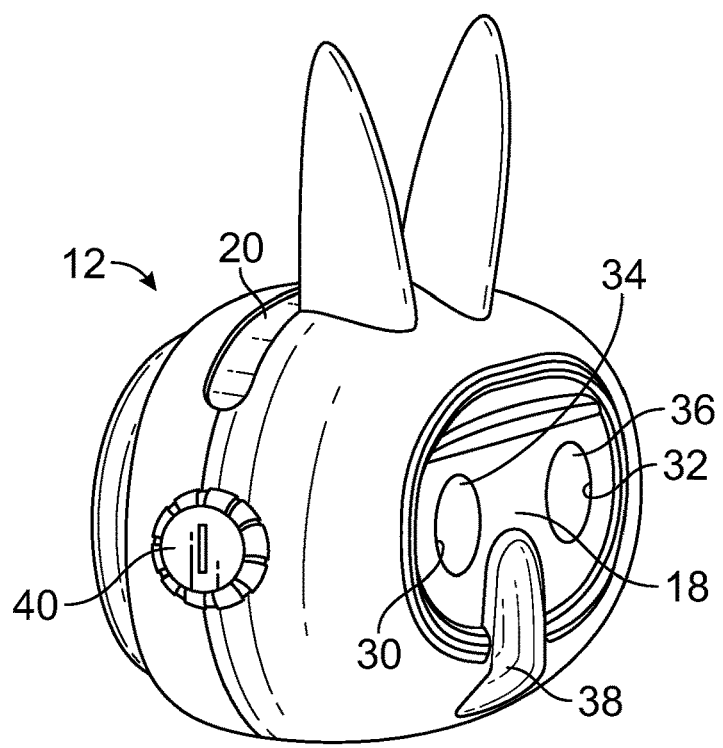
FIG. 3 is an isometric view of the head portion housing of the toy apparatus illustrating a second viewing configuration.

Referring to FIGS. 1-3, there is illustrated a toy apparatus 10 in the form of a cartoonish spaceman figure for supporting an electronic display device, such as a smart phone with a display screen like an iPhone®, that is arranged to direct the display screen of the smart phone in oppositely disposed first and second directions. The toy 10 includes a head portion housing 12 in the shape of an enlarged helmet with "rabbit ears" 13, 14 and a body portion 15. The toy may mimic any character, playful animal or some other object, some examples of which are disclosed below. The toy may be provided with a plush body portion and a plastic helmet head portion, or alternatively, the character may be provided with both plush body and head portions, or with both plastic body and head portions, or shell, plush, and foam combined, or any other suitable material, or combination of materials.

The head portion housing 12, includes a first viewing configuration 16 in the an opening that may be considered a front or forward-facing viewing configuration when the toy has a humanoid appearance, as illustrated in FIG. 1, and a second viewing configuration 18 in the form of a recess that may be considered a rear or rearward-facing viewing configuration as illustrated in FIG. 3. The hollow helmet shape of the head portion housing 12 defines a generally large interior cavity therein as will be described in detail below. The head portion 12 is constructed with a top slot 20, FIGS. 2 and 3, for receiving the smart phone or other electronic display device. The electronic display device is arranged to direct the display screen of the smart phone in oppositely disposed for different viewing configurations. When an app is activated on the smart phone the user is allowed to interact with the toy and also experience character-based visions by exploring inspirited realms, known as virtual reality worlds.

The term 'viewing configuration' is considered from the standpoint of a user who views the toy alternately from a first side of the toy and then from a second side of the toy. Smart phones include an orientation sensor and this may be used to alternate apps as a function of the actual orientation of the display screen. As used here, Virtual Reality (VR) includes hardware and software that creates virtual environments; Augmented Reality (AR) includes hardware and software that layers information, data, and characters over real world environments; and Mixed Reality (MR) includes hardware and software that mixes information, data and characters within real world environments. As mentioned, the electronic display device may include an iPhone as well as other smart phone brands, along with devices, such as an iPad® and competing brands. In addition, other similar devices now existing or created in the future are also included. Such devices may include or receive applications (apps) that provide VR, AR and MR viewing.

When a smart phone is placed in the head portion housing 12 through the slot 20, a user who faces first viewing configuration (the opening) 16 is able to see the smart phone and any app displayed. Screen displays, such as a pair of "glowing eyes" 22, FIG. 1, or "evil eyes" 24, FIG. 8, or a "cute face" 26, FIG. 6, may each be part of a story recited by the app to entertain the user. When the smart phone is rotated 180° from a first position where the phone's display screen was viewable through the first viewing configuration 16, the user facing the second viewing configuration (the recess) 18 may be able to view a three-dimensional VR app. The recess 18 at the rear of the head portion may include two viewing ports 30, 32, FIG. 3, each covered with 3D lens 34, 36, such that the display screen of the smart phone may be viewed playing a VR app. A nose recess 38 may be provided below and between the viewing ports 30, 32 to allow the user to bring his/her face up to the viewing ports 30, 32. A side mounted control knob 40 functions to rotate the internally located smart phone. A control is described with a support structure in the housing is responsive to the control and support the received device between a first position with its display facing the first opening and a second position with its display facing the second opening of the housing where the orientation sensor of the received device changes its display for being upright for viewing respectively through the first opening in the first position and for viewing through the second opening in the second position.

Figure 4:
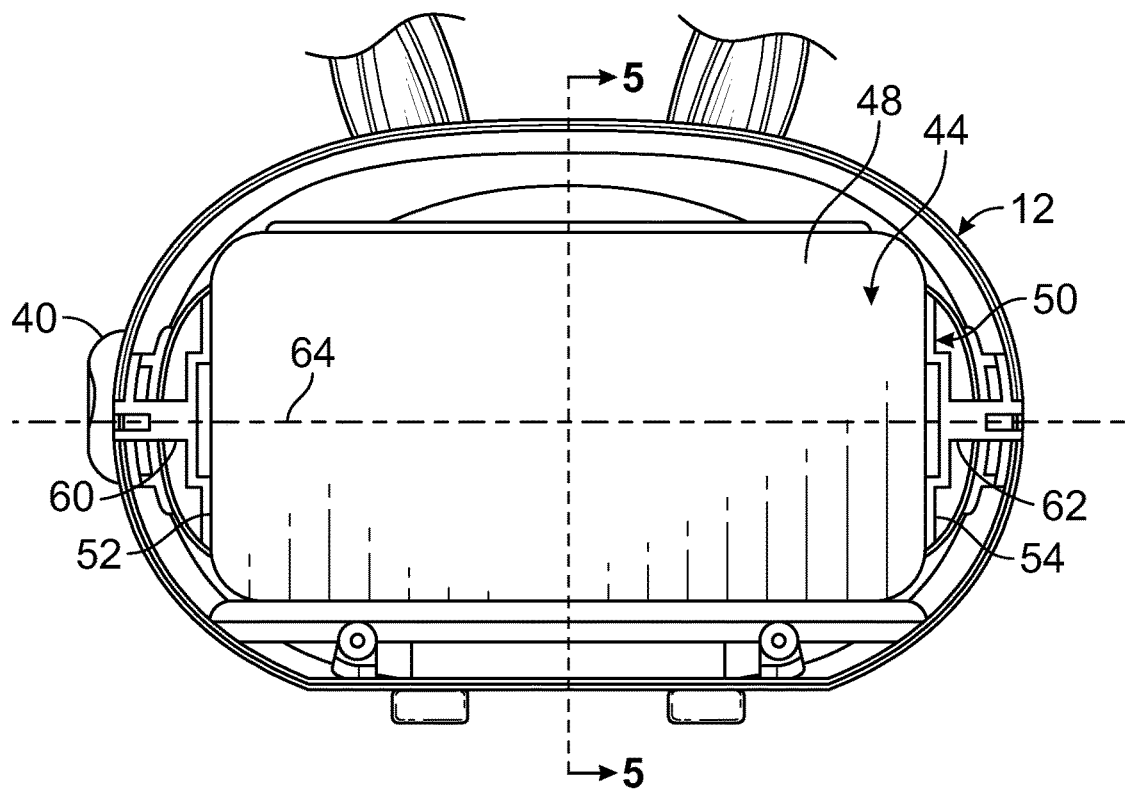
FIG. 4 is a front sectional view of the head portion housing illustrating an internal smart phone.
Figure 5:
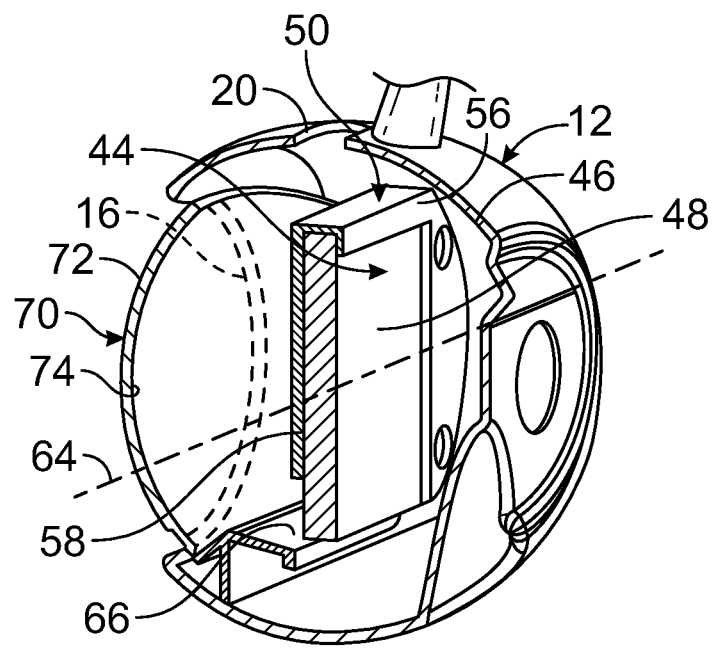
FIG. 5 is an isometric section view taken along line 5-5 shown in FIG. 4.

The smart phone 44, FIGS. 4 and 5, is illustrated in the interior 46 of the head portion 12. The smart phone includes a display screen 48 and a support structure 50 in the form of a frame that is rotatable by the control knob 40 between a first position where the display screen is facing forward toward the opening 16, illustrated in FIG. 4, and a second position where the display screen is facing rearward toward the recess 18 and the viewing ports 30, 32. The support frame 50 includes opposing resilient sides 52, 54 and a channel shaped base 56. A back brace 58 extends from the base 56 to provide additional support. Opposing shafts 60, 62 are connected respectively to the frame sides 52, 54 and are mounted to the head portion housing 12 to allow a 180° rotation around an axis 64 of the frame 50 and the supported smart phone 44 when the user operates the control knob 40. A ledge 66 is provided in the head portion 12 to also support the smart phone 44 when it is rotated to the upside down position as shown in FIG. 5.

A closure panel 70 in the form of a curved visor is also mounted within the head portion 12 to cover the opening 16 when the smart phone is in its second position where the display screen is facing rearward toward the second viewing configuration and the viewing ports 30, 32. The visor 70 rotates together with the smart phone or upwards when the user is looking at the first viewing configuration, however, when the smart phone is rotated so that the display screen in facing the second viewing configuration the visor is simultaneously rotated to a lowered position. In the lowered position, an outer surface 72 of the visor may feature a cute character face such as that shown in FIGS. 2 and 7. An inner surface 74 of the visor 70 may serve as a dark backdrop to the smart phone when the smart phone display screen is facing the viewing ports 30, 32.

The body portion 15, FIG. 1, of the toy 10 may include two arms 76, 78 and two legs 80, 82. The toy may also include a tail 84 to help stabilize the toy when it is displayed on a surface and act as a handle for the user to hold when viewing the smart phone from either the front or the rear.

Figure 6:
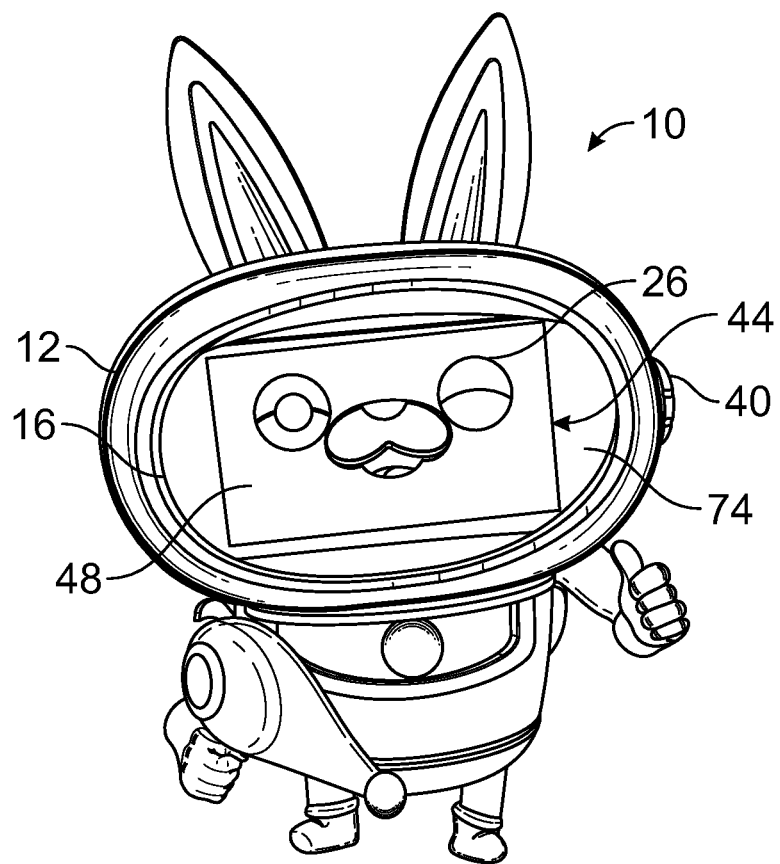
FIG. 6 is an isometric view of the toy apparatus with the internal smart phone where the smart phone is illustrating an app.
Figure 7:
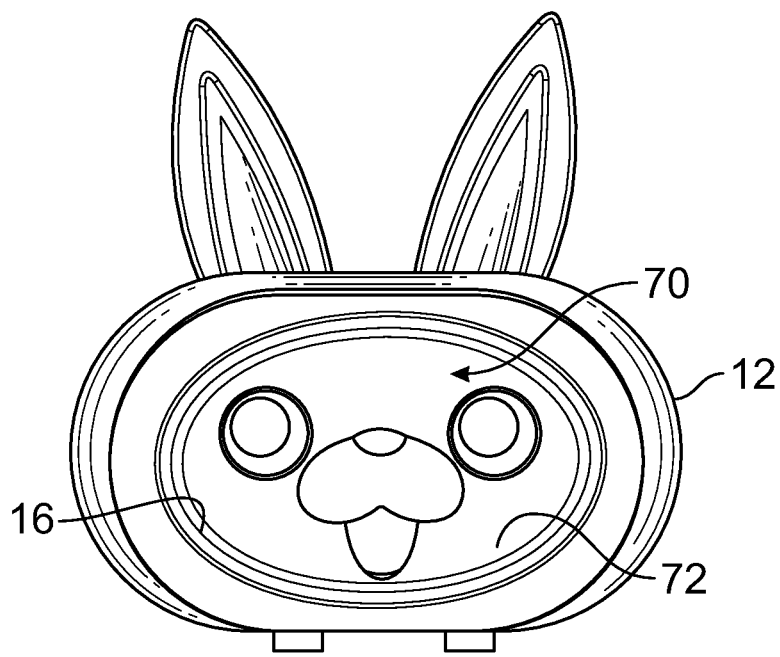
FIG. 7 is a front elevation view of the head portion housing illustrating the outer surface of a visor.
Figure 8:
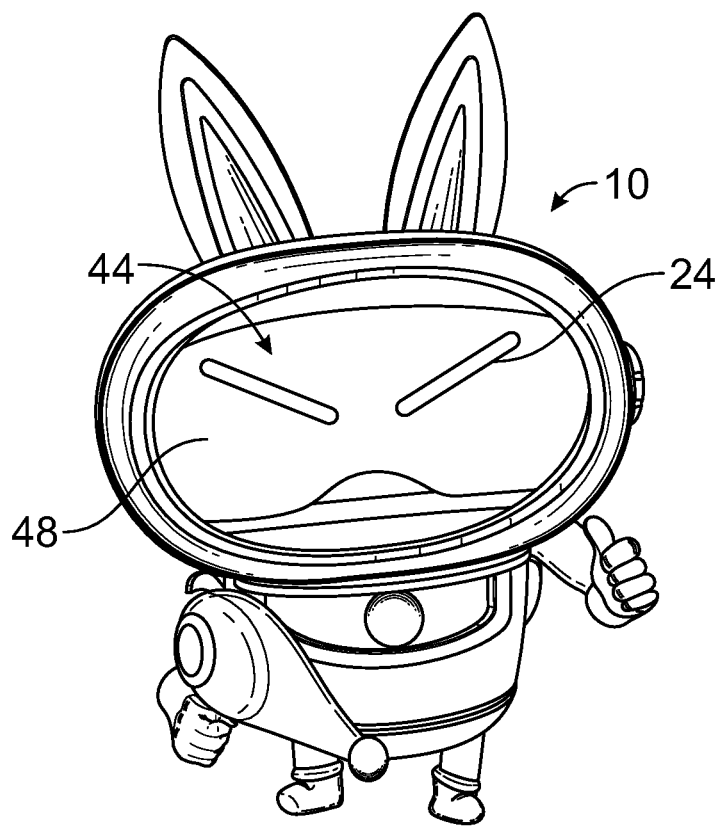
FIG. 8 is an isometric view of the toy apparatus where the smart phone is illustrating another app.

The toy 10, shown in FIGS. 6 and 8, illustrate the screen 48 of the smart phone 44 facing a user through the front opening 16, the first viewing configuration, whereas the head portion 12, FIG. 7, illustrates the first viewing configuration 16 after the visor 70 (and the smart phone) have been rotated 180° and the face feature on the outer surface 72 of the visor 70 is visible.

Figure 9:
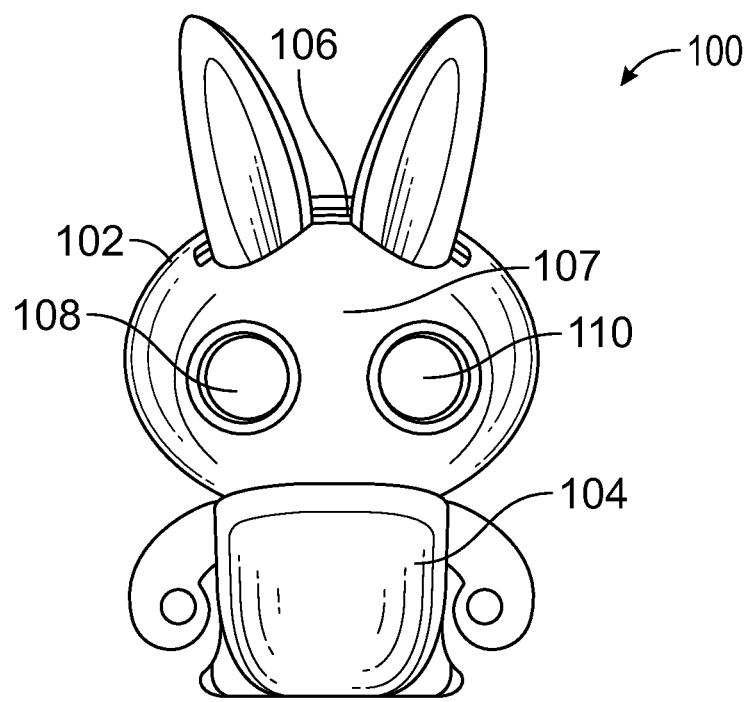
FIG. 9 is a front elevation view of another embodiment of the toy apparatus illustrating the first viewing configuration.
Figure 10:
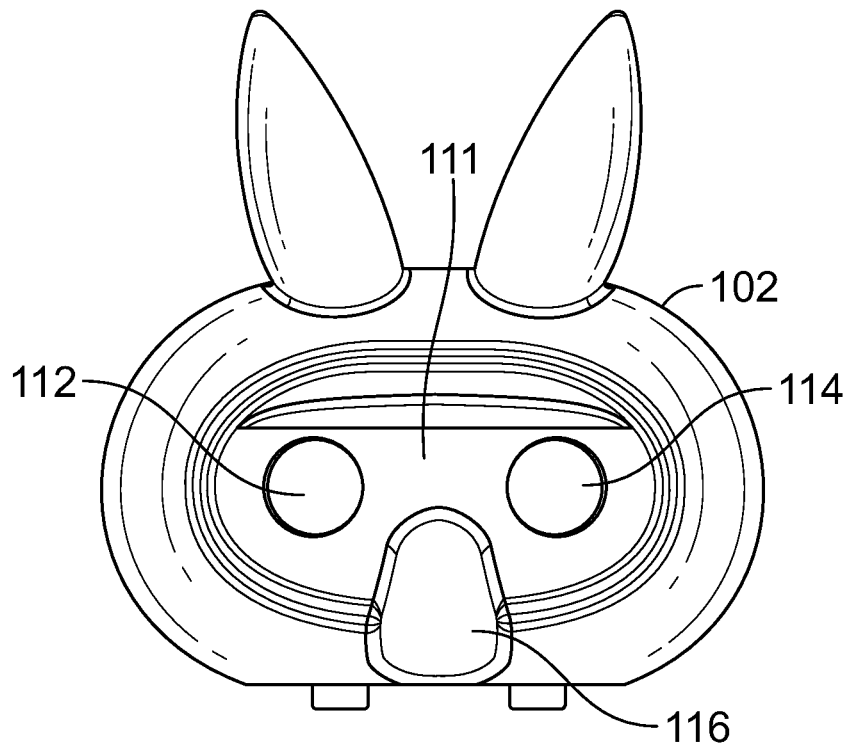
FIG. 10 is a front elevation view of the head portion housing of the embodiment of the toy apparatus shown in FIG. 9, illustrating the second viewing configuration.

Referring now to FIGS. 9 and 10, a somewhat different toy apparatus 100 is illustrated with a head portion housing 102 and a body portion 104. The head portion includes a slot 106 for receiving a smart phone, however, the first viewing configuration or front 107 of the head portion includes two eye openings 108, 110 instead of one large opening like with the embodiment of FIGS. 1-5. The second viewing configuration or rear 111 of the head portion may also include two eye openings 112, 114 and a nose recess 116 like the embodiment of FIGS. 1-5.

Figure 11:
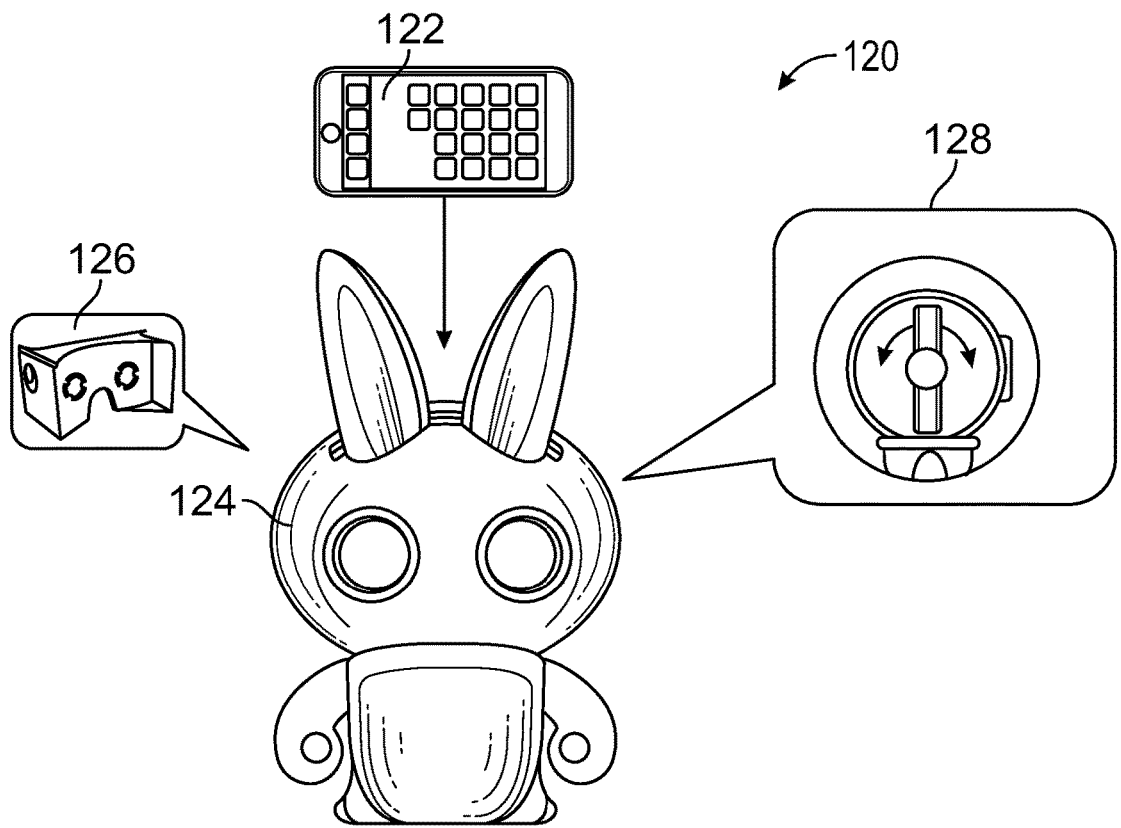
FIG. 11 is a front elevation view of the embodiment of the toy apparatus shown in FIG. 9, and illustrating the addition of a 3D viewer, a smart phone and a graphic depiction of the smart phone being rotatable.

The toy apparatus 120 illustrated in FIG. 11, graphically depicts the insertion of a smart phone 122 into the head portion housing 124 of the toy, along with a three-dimension viewer 126 formed in the second viewing configuration or rear (not shown) of the head portion 124, and the ability of the smart phone 122, once inserted, to rotate, graphically depicted in the box 128, so that the display screen of the smart phone may be alternately viewed by a user from both the first and second viewing configurations or both the front and the rear of the toy.

Figure 12:
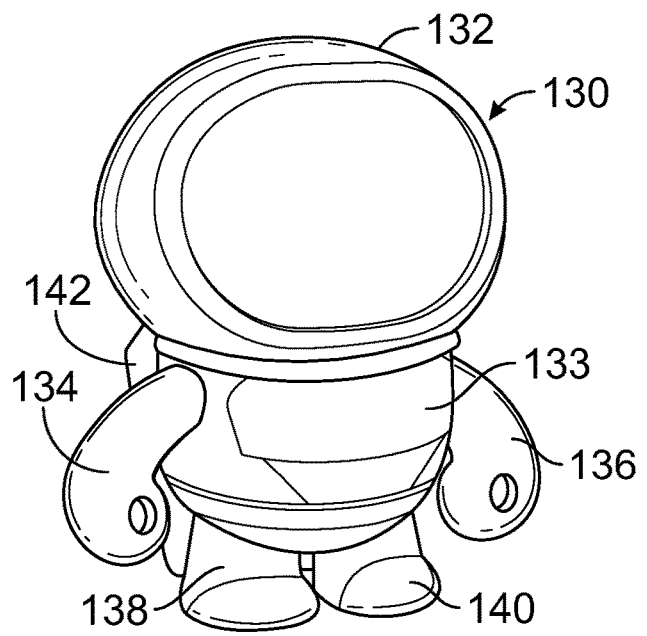
FIG. 12 is an isometric view of another embodiment of the toy apparatus.

The toy 130 illustrated in FIG. 12, is yet another embodiment illustrating a space alien having a head portion housing 132 and a body portion 133 with two arms 134, 136, two legs 138, 140, and a backpack 142.

Figure 13:
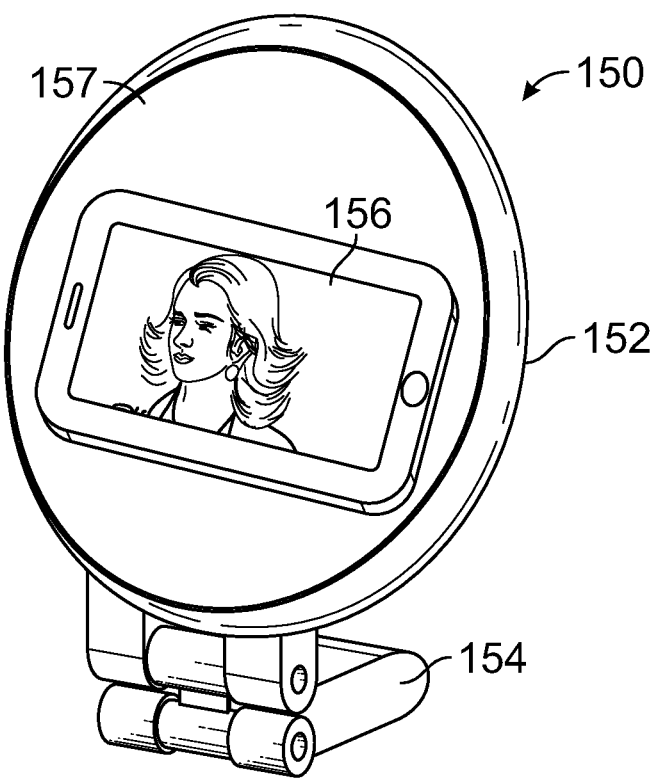
FIG. 13 is an isometric view of still another embodiment of the toy apparatus in the form of a make-up mirror and illustrating a first viewing configuration.
Figure 14:
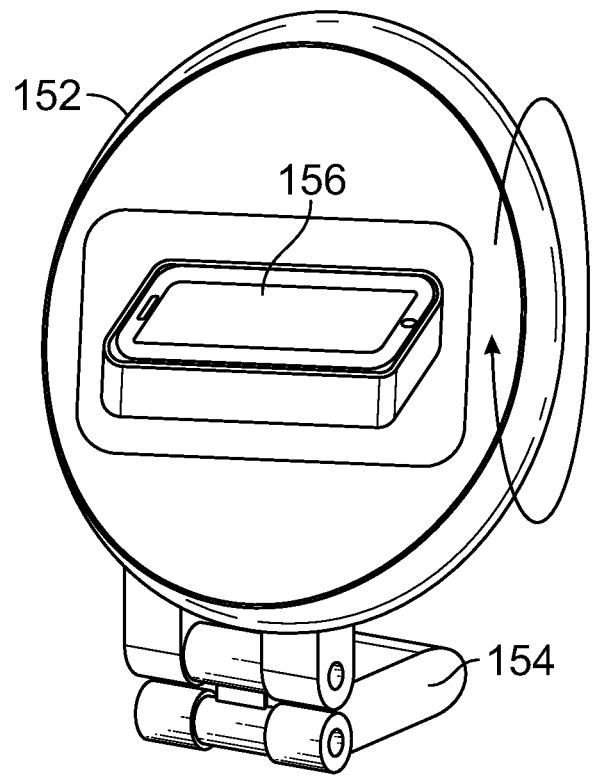
FIG. 14 is an isometric view of the embodiment of the toy apparatus shown in FIG. 13, illustrating rotation of a smart phone.
Figure 15:
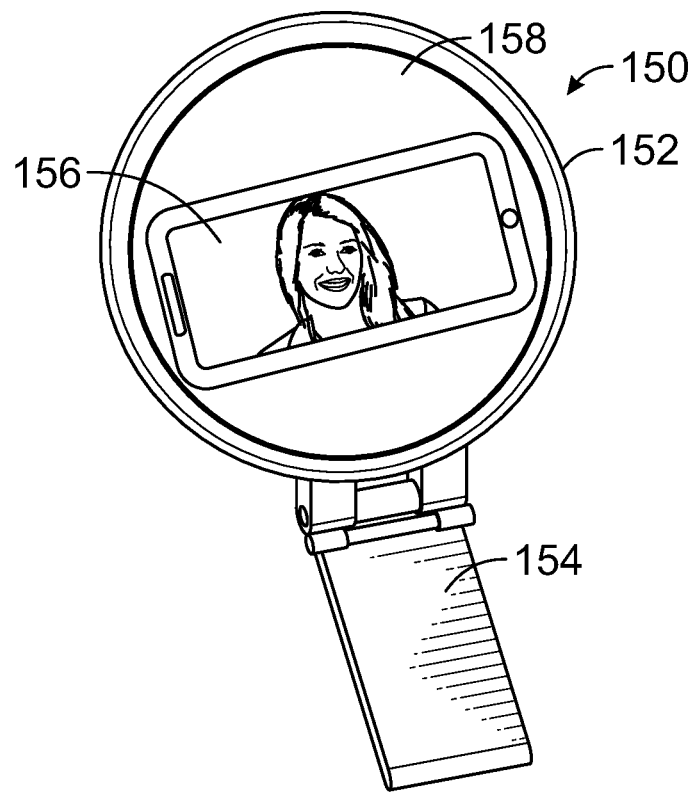
FIG. 15 is an isometric view of the embodiment of the toy apparatus shown in FIG. 13, illustrating a second viewing configuration.

Referring now to FIGS. 13-15, there is shown still another embodiment of the present invention in the form of a make-up mirror toy 150 having a mirror housing 152 and a rotatable base 154. The toy 150 provides for receipt of a smart phone 156 in the mirror housing 152, for first and second sides 157, 158, and for control of the mirror housing allowing it to be rotatable such that different apps may be viewed in first and second viewing configurations by a user in much the same fashion as disclosed in detail in relation to the embodiment shown in FIGS. 1-5.

Figure 16:
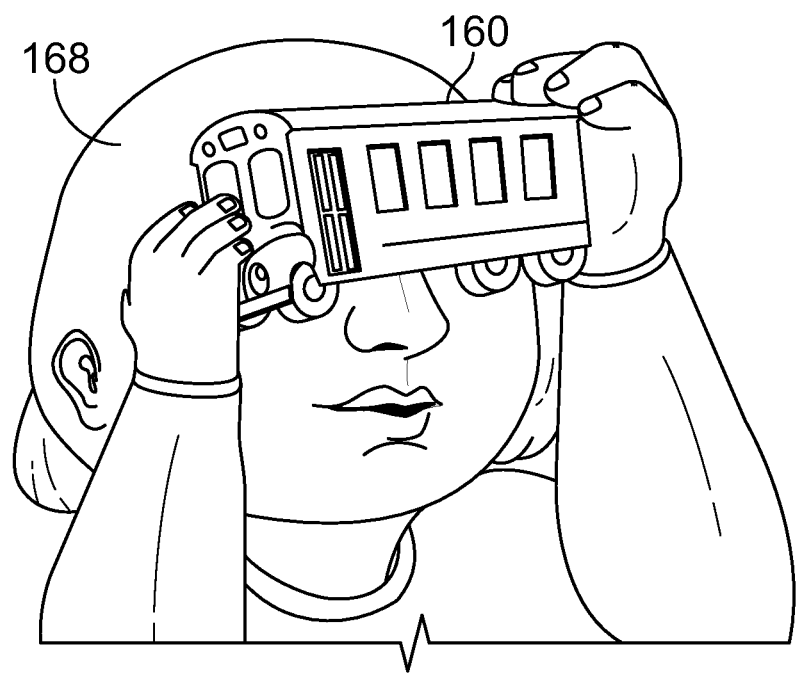
FIG. 16 is an isometric view of a user viewing yet another embodiment of the toy apparatus in the form of a school bus.
Figure 17:
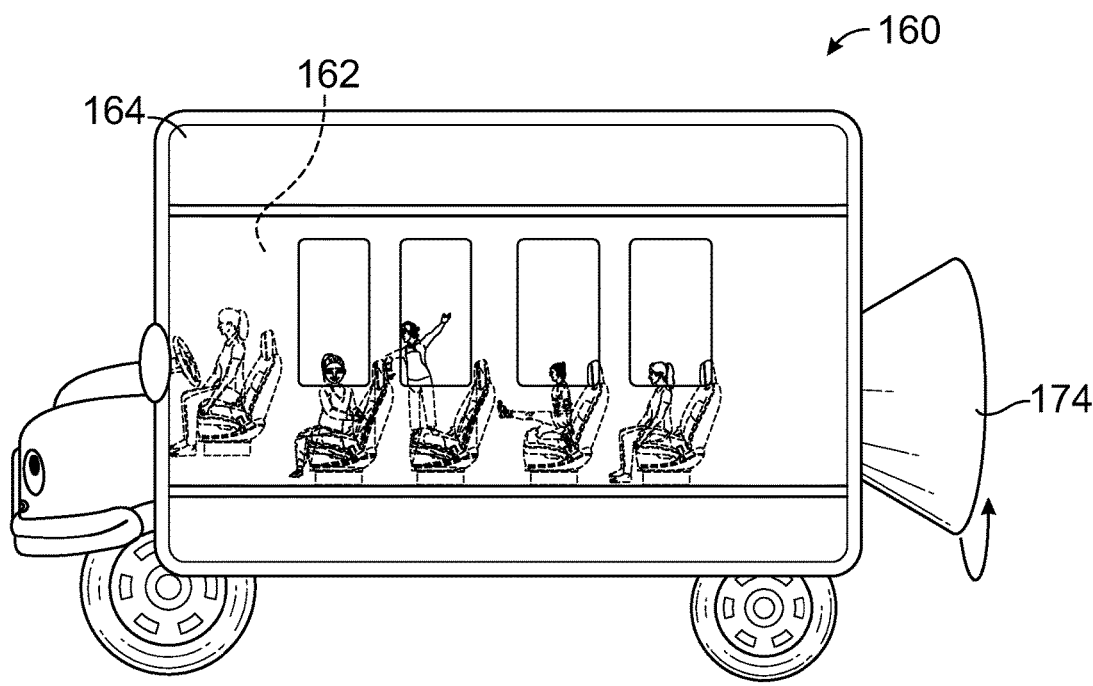
FIG. 17 is an elevation view of the school bus embodiment of the toy apparatus illustrating a first viewing configuration.
Figure 18:
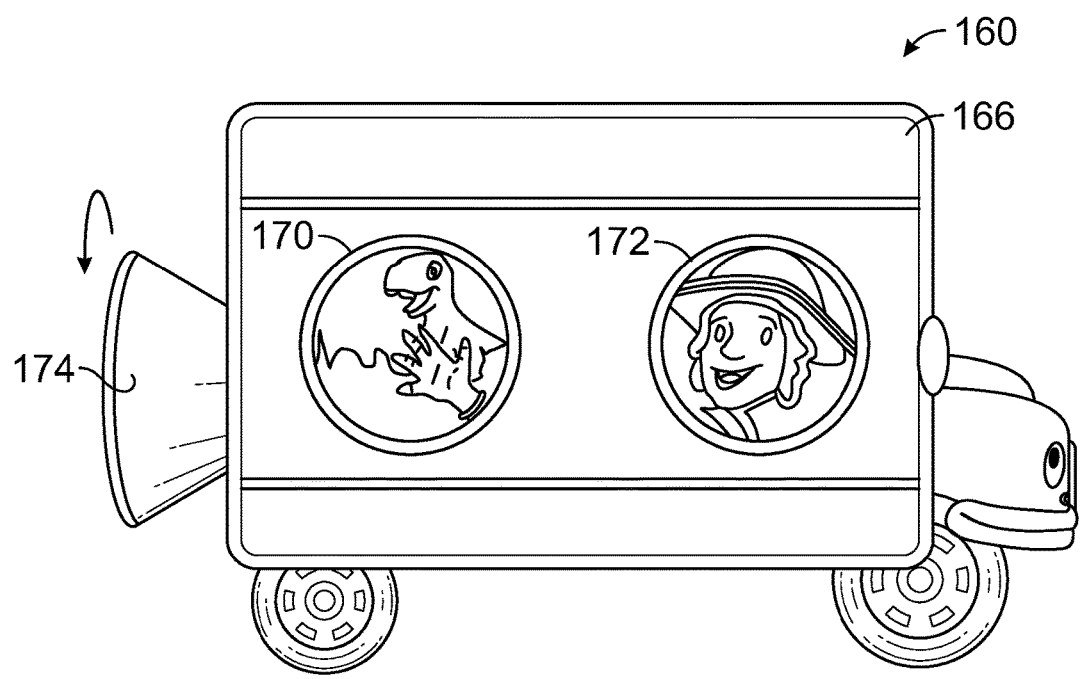
FIG. 18 is an elevation view of the school bus embodiment of the toy apparatus shown in FIG. 17, illustrating a second viewing configuration.

Another toy embodiment is illustrated in FIGS. 16-18, where the toy apparatus 160 is configured as a school bus. A smart phone 162 is viewable through a first side or first viewing configuration 164 of the school bus similar to the view through the opening 16 of the embodiment shown in FIGS. 1-5. The alternate view is depicted in FIGS. 16 and 18, where a second side or second viewing configuration 166 of the bus is analogous to the view of the smart phone 44, FIG. 3, through the openings 30, 32 in the recess 18. A user 168, FIG. 16, is depicted viewing the smart phone openings 170, 172 after rotating the smart phone using a control knob 174.

Figure 19:
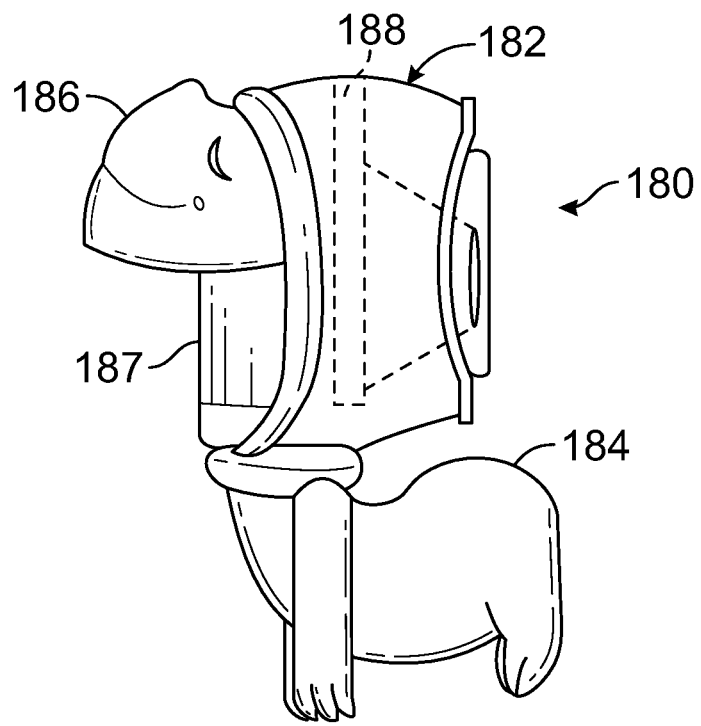
FIG. 19 is an elevation view of another embodiment of the toy apparatus illustrating a first viewing configuration.
Figure 20:
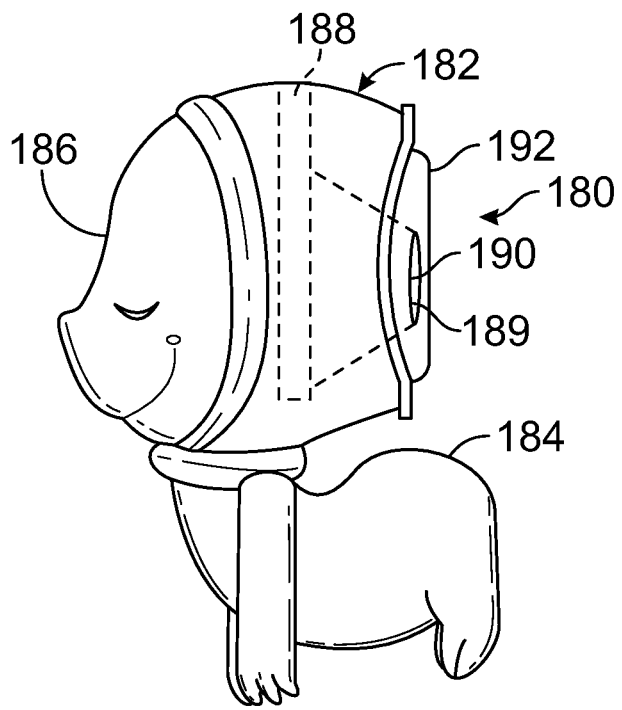
FIG. 20 is an elevation view of the embodiment of the toy apparatus shown in FIG. 19, illustrating a second viewing configuration.

A further embodiment is illustrated in FIGS. 19 and 20, where the toy apparatus is formed as a stylized baby toy 180 having a head portion housing 182 and a body portion 184 where the baby's face is in the form of a closure panel or visor 186 that is rotatable to a raised position shown in FIG. 19. When in the raised position a user is allowed to view from a first or front viewing configuration 187 an AR or MR app playing on a smart phone 188 inserted within the head portion housing 182 of the baby toy 180. After the user rotates the visor 186 and the smart phone 188, the user is able to view a VR app from the rear second viewing configuration 189 through two viewing ports, of which one viewing port 190 is shown, in the rear 192 of the baby's head portion 182.

The received smart phone includes an orientation sensor within and is responsive to the orientation of the received device for changing the display of the received device from being upright for viewing respectively through the first viewing configuration in the first position and for viewing through the second viewing configuration in the second position. When the display screen of the received smart phone is disposed towards the forward-facing opening the digital character's face will show through the opening facilitating character game play, and when the user rotates the control knob on the side of the head portion of the housing 180°, the smart phone rotates, disposing the display screen towards the rearward-facing opening. The internal function of the smart phone will trigger a virtual reality (VR) application and the user can look through the rearward openings, which, in the present described embodiment, are eyes in the toy, and see the VR world.

In operation, the user downloads apps on a smart phone from the seller of the toy, or others, and inserts the smart phone into the toy housing placing the display screen of the smart phone facing the front opening or first side or first viewing configuration of the toy. The app entertain and/or interact with the user and after a predetermined time will instruct the user to rotate the smart phone to cause the display screen to face the rear or second side or second viewing configuration of the toy. The user may then be entertained by a VR app until the user is instructed to again rotate the display screen of the smart phone to face the front or first side or first viewing configuration of the toy.

Character/Virtual Reality (VR) Play Cycle

In the present described embodiment, the form of a character allows the user to play with an animated character plush and enter VR worlds by flipping a smart phone in the head housing. The character will begin any play cycle in CHARACTER MODE, speaking with the user about a variety of activities the user and character can do together. When there is a "Call to Action" by the character to switch to a VR based activity, the character will prompt the user to flip down his visor to enter the VR MODE and peer into the head housing to play a mini-game. Alternatively, the user may choose to enter the VR mode at any desired time. The user can then open the character's visor again to hang out with the character or select a new activity. The concept ratio of "Time playing with the front screen" in character mode to "Time playing in VR mode" will likely be 80% Front Screen to 20% rear screen although the ratio may change.

Character Mode

Insert the user's smart phone and rotate the visor so the screen is facing outward from the front of the toy. The character's face animates and he comes to life. The user can participate in the following activities while the character is in character mode:

1. Medal Recognition
2. Care-Taking
3. Face Customization, Selection and Warping
4. Mission Select
5. Character-based Chat
6. Character-based Portal
7. Game Guide VR Mode With smart phone inserted and a "Call to Action" by the character, the user will lower the character's visor when prompted and the display screen will be rotated to face the back of the character's head portion. The user will look into the lenses on the back of the head portion to participate in a variety of activities including the following:

1. Mini Games
   Asteroid Game
   Detective Game
   Rocket Building Game
   Hunt game
   Snap AR game play with AR switch detections in field of view
2. Interactive Cinematics App Connected Play
   The character embodiment may reference other character related Apps to access user information and medal collection information.
   Activating VR-Flip the character requires downloading the YO-KAI Vision the character App.

From the foregoing it can be seen that there has been provided an apparatus with a toy housing incorporating a support mechanism which simply yet precisely disposes a received electronic device displayed upright in a forward-facing opening in a first supported position and in a rearward-facing opening in a second supported position for alternate game play and virtual reality viewing. While particular embodiments of the present invention has been shown and described, it will be obvious to those skilled in the art that changes and modifications may be made without departing from the invention in its broader aspects. Therefore, the aim in the claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A toy apparatus for supporting an electronic display device for alternate viewing configurations, comprising:
a toy housing having a first viewing configuration and a second viewing configuration, wherein the second viewing configuration includes a pair of lenses mounted in the housing, and the toy housing having an interior for receiving the electronic display device therein, the received device including an orientation sensor responsive to the orientation of the received device for changing the display of the received device;
a control mounted to the housing for changing the orientation of the electronic display device; and
a support structure in the housing responsive to the control for supporting the received electronic display device in the first viewing configuration and the second viewing configuration.

2. The toy apparatus according to claim 1, wherein:
the lenses are structured to enable 3D viewing.

3. The apparatus according to claim 1, wherein:
the housing includes a closure panel movable between front and second position.

4. The apparatus according to claim 3, wherein:
the support structure and the closure panel are connected to enable simultaneous rotation.

5. The apparatus according to claim 1, wherein:
the support structure is a frame for mounting the electronic display device, the frame having opposing shafts, where one of the shafts is connected to the control.

6. The apparatus according to claim 1, wherein:
the first viewing configuration includes an opening in the housing to enable a user to view the display of the electronic display device.

7. The apparatus according to claim 1, wherein:
the second viewing configuration includes a pair of lenses mounted in the housing;
the lenses are structured to enable 3D viewing; and
the housing includes a closure panel movable between first and second positions.

8. The apparatus according to claim 7, wherein:
the first viewing configuration includes an opening in the housing to enable a user to view the display of the electronic display device;
the second viewing configuration includes 3D lenses mounted to the housing for viewing the display of the electronic display device; and
the support structure and the closure panel are connected to enable simultaneous rotation.

9. The apparatus according to claim 8, wherein:
the support structure is a frame for mounting the electronic display device, the frame having opposing shafts, where one of the shafts is connected to the control.

10. A toy apparatus for supporting an electronic display device for alternate viewing configurations, comprising:
a toy housing having first and second sides and first and second viewing configurations, including a 3D viewer mounted in the toy housing at the second side with the second viewing configuration, the toy housing having an interior for receiving the electronic display device therein, the received device including an orientation sensor responsive to the orientation of the received device for changing the display of the received device;
a support structure in the toy housing for supporting the received electronic display device to enable a user when viewing the first side of the toy housing to view the electronic display device in the first viewing configuration and when viewing the second side of the toy housing to view the electronic display device in the second viewing configuration; and
a control mounted to the housing for changing the orientation of the electronic display device.

11. The apparatus according to claim 10, including:
a closure panel mounted to rotate with the electronic display device between first and second positions and wherein the closure and the electronic display device are moveable by the control.

12. The apparatus according to claim 11, wherein:
the closure panel and the support structure are arranged to be rotated by the control through 180°.

13. The apparatus according to claim 10, including:
a 3D viewer mounted in the toy housing at the second side and included in the second viewing configuration;
a closure panel mounted to rotate with the electronic display device between first and second positions and wherein the closure and the electronic display device are moveable by the control; and wherein
the closure panel and the support structure are arranged to be rotated by the control through 180°; and wherein
the second viewing configuration includes the closure panel in a lowered position the at the first side of the housing and the electronic display device is viewable through the 3D viewer, and the closure panel is raised in the second position at the first side of the housing and the electronic display device is rotated 180° to be viewable through the first side.

14. A toy apparatus for supporting an electronic display device for alternate viewing configurations, comprising:
a toy housing having first and second sides and first and second viewing configurations, wherein the second viewing configuration includes a pair of lenses mounted in the housing, the toy housing having an interior for receiving the electronic display device therein, the received device including an orientation sensor responsive to the orientation of the received device for changing the display of the received device;
a support structure in the toy housing for supporting the received electronic display device to view the electronic display device in the first viewing configuration and further to view the electronic display device in the second viewing configuration; and
a control mounted to the housing for changing the orientation of the electronic display device.

15. The apparatus according to claim 14, wherein:
the pair of lenses is structured as a 3D viewer mounted in the toy housing at the second side.

16. The apparatus according to claim 14, including:
a closure panel mounted to rotate with the electronic display device between first and second positions and wherein the closure and the electronic display device are moveable by the control.

17. The apparatus according to claim 16, wherein:
the closure panel and the support structure are arranged to be rotated by the control through 180°.

18. The apparatus according to claim 17, wherein:
the second viewing configuration includes the closure panel in a lowered position at the first side of the housing and the electronic display device is viewable through the 3D viewer, and the closure panel is raised in the second position at the first side of the housing and the electronic display device is rotated 180° to be viewable through the first side.

19. The apparatus according to claim 14, wherein:
the support structure is controlled responsive to the control to enable a user when viewing the first side of the toy housing to view the electronic display device in the first viewing configuration and when viewing the second side of the toy housing to view the electronic display device in the second viewing configuration.

20. The apparatus according to claim 19, including:
a closure panel mounted to rotate with the electronic display device between first and second positions wherein the closure and the electronic display device are moveable by the control, and wherein the support structure and the closure panel are connected to enable simultaneous rotation.

* * * * *